United States Patent [19]
Nara et al.

[11] 3,717,548
[45] Feb. 20, 1973

[54] METHOD FOR PREPARING AMINOCYCLOHEXYLPENICILLIN

[75] Inventors: Takashi Nara; Ryo Okachi, both of Tokyo, Japan

[73] Assignee: Kyowa Hakko Kogyo Co., Ltd., Tokyo, Japan

[22] Filed: Oct. 12, 1970

[21] Appl. No.: 80,227

[30] Foreign Application Priority Data

Oct. 24, 1969 Japan .................................. 44/84653

[52] U.S. Cl. ................................................ 195/36 P
[51] Int. Cl. ................................................ C12d 9/06
[58] Field of Search .................................. 195/36 P

[56] References Cited

UNITED STATES PATENTS 3,047,467  7/1962  Doyle et al. ........................... 195/36 P
3,553,201  1/1971  Clark et al. ........................... 260/239.1

Primary Examiner—Alvin E. Tanenholtz
Attorney—Ralph T. Lilore

[57] ABSTRACT

An enzymatic process for the preparation of aminocyclohexylpenicillin is disclosed. The process involves reacting together 6-aminopenicillanic acid or other penicillins and aminocyclohexyl carboxylic acid, or esters and/or acid addition salts thereof in the presence of an enzyme elaborated by such microorganisms as are found in the genera Pseudomonas, Kluyvera, Escherichia, Aerobacter, Micrococcus, Streptomyces, Nocardia, Aspergillus or Penicillium.

10 Claims, No Drawings

METHOD FOR PREPARING AMINOCYCLOHEXYLPENICILLIN

BACKGROUND OF THE INVENTION

This invention relates to the method for producing aminocyclohexylpenicillin. More particularly it relates to the enzymatic production of aminocyclohexylpenicillin from penicillins, especially 6-aminopenicillanic acid, in the presence of aminocyclohexylcarboxylic acid and esters and acid addition salts thereof.

Aminocyclohexylpenicillin is a broad spectrum-antibiotic effective against a wide range of gram negative and gram positive pathogenic bacteria. This penicillin is characteristic in being more active in vivo than in vitro to many bacterial organisms causing human infection. This point is very different from ampicillin which is also a type of broad spectra in antibacterial properties but is inferior in vivo activities to aminocyclohexylpenicillin. Aminocyclohexylpenicillin can cure diseases caused by *Staphylococcus aureus*, *Diplococcus pneumoniae*, *Streptococcus* sp., *Neisseria* sp., *Escherichia coli*, *Shigella* sp. and many others.

Dosage of aminocyclohexylpenicillin required for oral administration is about 1 g. per day.

DETAILED EXPLANATION OF THE INVENTION

A process has now been discovered whereby aminocyclohexylpenicillin can be elaborated from penicillins, especially 6-aminopenicillanic acid, (hereinafter referred to as "6-APA") as well as from other penicillins. The process involves reacting the aminocyclohexylcarboxylic acid or functional derivatives thereof with the penicillins in the presence of an enzyme derived from microorganisms of any of the genera Pseudomonas, Kluyvera, Escherichia, Aerobacter, Micrococcus, Streptomyces, Nocardia, Aspergillus or Penicillium. As will become apparent below the actual cell bodies or culture liquid of the microorganisms may be used as the reaction vehicle. Pseudomonas and Kluyvera are the preferred genera.

One of the basic substrates utilized in the process of the invention is a penicillin compound, that is a compound having the basic structure

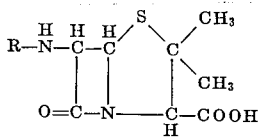

or esters, salts and acid addition salts thereof, wherein R is hydrogen or an acyl radical normally found in the penicillin compounds. R is usually a pharmaceutically acceptable group such as is found in penicillin V, G and the like though it need not be. Typical groups are phenoxyacetyl, phenylacetyl, γ-chlorocrotyl mercaptoacetyl and the like. Virtually any group can be used, the only criteria being that the basic penicillin skeletal structure be present. Preferred for use is 6-APA or penicillin G or V. Penicillin V is phenoxymethylpenicillin and penicillin G is benzylpenicillin.

The penicillin substrate is preferably employed as a salt, usually an alkali metal or alkaline earth metal salt and preferably as the sodium, potassium or calcium salt. The compounds may also be used in the form of the acid addition salts such as the hydrochloride, hydrobromide, hydroiodide, hydrogen phosphate or the like.

The aminocyclohexylcarboxylic acid reactant may be employed as the free acid but it is preferred to utilize the same as a functional derivative and most preferably as an acid addition salt of the derivative. Suitable acid derivatives are the amides, alkyl esters or alkali metal salts of the compound. Preferred for use are the alkyl esters having from one to four carbon atoms and especially the methyl or ethyl ester, although the sodium or potassium salts may also be used. As acid addition salts there may be employed the acid salts derived from the mineral acids such as the hydrochloride, as is preferred, or the hydrobromide, hydroiodide, hydrogen phosphate or the hydrogen sulfate compounds. The following flow diagrams are representative of the process of the invention.

a. In case 6-APA is used as a substrate;

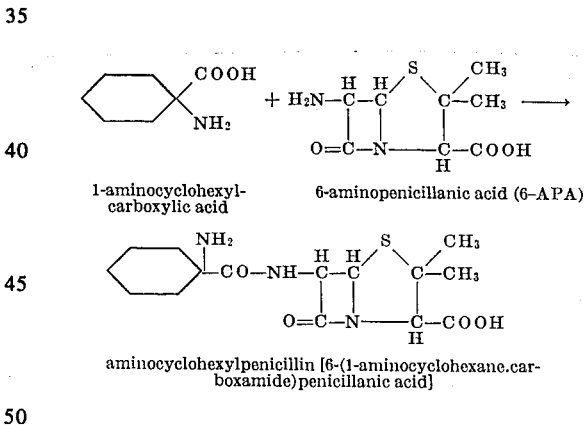

b. In case penicillin G is used as a substrate:

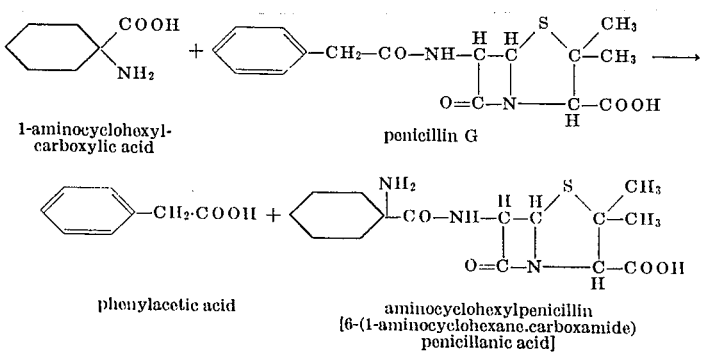

The microorganisms used in the present invention are those belonging to Pseudomonas, Kluyvera, Escherichia, Aerobacter, Micrococcus, Streptomyces, Nocardia, Aspergillus or Penicillium, especially the strains thereof which have acquired a very powerful enzymatic activity for synthesizing aminocyclohexylpenicillin by applying a hereditary mutation (for example, ultraviolet ray irradiation, X-ray irradiation or treatment with amutation-initiating agent) thereto.

The specific bacteria, ray fungi and molds belonging to said genera and used in the present invention, have a very powerful ability to form aminocyclohexyl-penicillin from 6-APA or other penicillins and aminocyclohexylcarboxylic acids. The optimum pH of the enzymatic activity in these microorganisms lies in a relatively wide range spanning slight acidity to neutrality to slight alkalinity.

To obtain the enzyme used in the process of the invention, strains of these microorganisms are cultured so that the desired enzyme is produced within the cell bodies and also preferably within the culture liquor. Culturing is preferably carried out for a sufficient time to allow the extracellular production and accumulation of the enzyme as described below.

As a culturing medium for these strains, there is employed a medium containing a carbon or energy source such as glucose, sucrose, starch, molasses, sorbitol, or other natural products containing an organic nitrogen source as well. For example, peptone, meat extract, yeast extract, cornsteep liquor, and the like may be used. The medium further contains suitable amounts of a nitrogen source such as urea, ammonia, ammonium sulfate, and ammonium chloride; or a natural nitrogen source such as cornsteep liquor, peptone, meat extract, yeast extract, and the like. Inorganic salts such as phosphates (potassium primary phosphate, potassium secondary phosphate, and the like); magnesium salts such as magnesium sulfate; metal ions such as iron, sodium, potassium manganese, zinc, calcium and the like and anions such as chlorides and nitrates are also preferably present. Other further nutrient substances necessary for the growth of these strains are employed as needed.

Culturing is carried out at a culturing temperature of 20°–50° C. and a pH of 5.0–9.0 under aerobic conditions such as by shake-culturing or submerged culturing techniques with aeration and agitation. Culturing time is usually 1 to 7 days. In this manner, the enzyme used for the synthesis is formed in the cultured cell bodies and usually within the culture liquor as well.

As indicated previously, the source of the enzyme used in the process of the invention may be the culture liquor itself, the cell bodies, the culture liquor free from the cell bodies, or the free enzyme alone, purified by salting-out with ammonium sulfate, dialysis, precipitation with acetone or ethanol, column chromatography, or the like. When the cell bodies are used it is preferred that they be used in a suspension or in an aceton-dried state. When the culture liquor is used, the substrate is added to the culture liquor and subjected to reaction therewith after the pH has been adjusted as indicated below.

The enzymatic reaction is carried out in a reaction liquid containing the two substrates and a suitable amount of the enzyme. The reaction medium may well be the fermentation liquor itself to which the substrates have been added. A buffer solution is preferably added to the reaction medium to facilitate the reaction within an optimum pH range. The reaction is possible in a wide pH range of 3–8, but particularly suitable is a range of from 4.5–7.5. The reaction is suitably carried out at 25° – 50° C., but preferably at 30° – 38° C. for 1 to 24 hours.

After the completion of the reaction, the aminocyclohexylpenicillin may be isolated and recovered by such well-known methods in suitable combination as a transfer extraction, precipitation via the addition of an organic solvent, or via isoelectric point precipitation. Additionally, ion exchange, column chromatography, and the like may be employed for isolation purposes.

The aminocyclohexylpenicillin obtained in the process of the invention is useable as an effective drug that can cure diseases caused by *Staphylococcus aureus*, *Diplococcus pneumoniae*, *Streptococcus* sp., *Neisseria* sp., *Escherichia coli*, *Shigella* sp. and many others.

Dosage of aminocyclohexylpenicillin required for oral administration is about 1 g. per day.

The following examples are given to illustrate preferred embodiments of the present invention.

EXAMPLE 1

The microorganism, *Pseudomonas melanogenum* ATCC 17808 is used, as a seed microorganism and a medium containing 1 percent peptone, 1 percent meat extract, 0.5 percent yeast extract and 0.3 percent sodium chloride is used as the seed medium. One platinum loop of the seed microorganism is inoculated into 20 ml. of the medium in a 250-ml. Erlenmeyer flask and culture at 30° C. for 24 hours with shaking. Thereafter 2 ml. of the seed culture liquor is inoculated in 20 ml. of a main fermentation medium placed in a 250-ml. Erlenmeyer flask.

Composition of the main fermentation medium is as follows: 0.5 percent peptone, 0.5 percent yeast extract, 0.5 percent Na L-glutamate, and 0.3 percent sodium chloride; pH before sterilization: 7.3 (adjusted with 5N NaOH).

After 48 hours from the start of the shaking culture at 30° C., cell bodies are separated from the fermentation liquor by centrifugal precipitation, and washed twice with an aqueous 0.9 percent sodium chloride solution. The cell bodies are then suspended in a 1/30 M phosphoric acid buffer of pH 6.8 at a dry cell content level of 10 mg./ml.. To this suspension are added sufficient 6-APA and the methylester of aminocyclohexylcarboxylic acid hydrochloride to obtain a level of 1.5 mg./ml. of the former and 5 mg./ml. of the latter respectively. The reaction is then carried out at 35° C. for 4 hours to yield 1.35 mg./ml. of aminocyclohexylpenicillin formed in the reaction solution.

EXAMPLE 2

As a seed microorganism, *Kluyvera citrophila* ATCC 21285 is used. The culturing conditions are the same as in Example 1, but a main fermentation medium prepared by adding 0.2 percent phenylacetic acid to the medium of Example 1 is used. The reaction is carried out in the same manner as in Example 1, using the cell bodies obtained after 48 hours from the start of culturing but using 3 mg./ml. of potassium salt of penicillin G to the reaction solution of Example 1 in place of 6-APA. Further, aminocyclohexylcarboxylic acid amide hydrochloride is used in place of the methyl ester of aminocyclohexylcarboxylic acid hydrochloride. In this manner, 2.5 mg./ml. of aminocyclohexylpenicillin is formed in the reaction solution after 5 hours from the start of the reaction.

EXAMPLE 3

*Escherichia coli* ATCC 13281 and *Aerobacter aerogenes* ATCC 8308 are used as seed microorganisms in two separate runs. The culturing conditions are the same as in Example 1. After 48 hours from the start of culturing, the cell bodies are recovered, suspended in an aqueous medium as described in Example 1, and then poured into a large amount of acetone. After aspiration filtering, acetone-dried cell bodies are obtained by ether washing the filtered cells.

The enzymatic reaction is carried out under the same conditions as in Example 1, using the acetone-dried cell bodies as the source of the enzyme. An additional 0.5 mg./ml. of 6-APA is added to the reaction solution after 3 hours from the start of the reaction and the reaction is continued for a further 2 hours. In this manner, the amount of aminocyclohexylpenicillin accumulated after 5 hours from the addition of the substrate corresponds to 1.20 mg./ml. in the case of *Escherichia coli* and 1.18 mg./ml. in the case of *Aerobacter aerogenes*.

EXAMPLE 4

Two strains of *Streptomyces phaeochromogenes* ATCC 21289 and *Nocardia globerula* ATCC 21292 are used as seed microorganisms in two separate runs. A medium containing 3 percent soluble starch, 2 percent soybean powders, 0.5 percent yeast extract and 0.1 percent calcium carbonate at a pH of 7.3 (before sterilization) is used as the main fermentation medium. Other culturing conditions are the same as in Example 1. At the fourth day of the culturing, 2.5 mg./ml. of penicillin (penicillin G in the case of *Streptomyces phaeochromogenes* and penicillin V in the case of *Nocardia globerula*) and 10 mg./ml. of the ethyl ester of aminocyclohexylcarboxylic acid sulfate are added thereto. The pH of the fermentation liquor is adjusted to 6.8, and the fermentation is further continued. During fermentation, the pH of the fermentation liquor is adjusted to 6.8 at 1 hour intervals with hydrochloric acid or a sodium hydroxide solution. In this manner, the amounts of aminocyclohexylpenicillin accumulated in the fermentation liquor after 6 hours from the addition of the substrates corresponds to 1.12 mg./ml. in the case of *Streptomyces phaeochromogenes* and 1.85 mg./ml. in the case of *Nocardia globerula*.

EXAMPLE 5

Two strains of *Aspergillus oryzae* ATCC 16450 and *Penicillium chrysogenum* ATCC 10135 are used as seed microorganisms in two separate runs. A medium containing 3 percent sucrose, 0.2 percent sodium nitrate, 0.1 percent potassium secondary phosphate, 0.05 percent magnesium sulfate, 0.05 percent potassium chloride, and 0.001 percent ferrous sulfate at a pH of 6.8 before sterilization is used as the main fermentation medium. 50 ml. of the main fermentation medium is placed in a 500-ml. Sakaguchi flask, and one platinum loop of the seed microorganism is inoculated therein. On the fifth day after shaking the culture at 27° C., 6-APA and potassium aminocyclohexylcarboxylate are added to the fermentation liquor so that the content of each corresponds to 2.0 mg./ml. and 10 mg./ml., respectively. The pH of the fermentation liquor is then adjusted to 5.0 and the fermentation is further continued. The amounts of aminocyclohexylpenicillin accumulated in the fermentation liquor after 6 days from the start of culturing are 2.02 mg./ml. in the case of *Aspergillus oryzae*, and 2.31 mg./ml. in the case of *Penicillium chrysogenum*, respectively.

After the separation of mycelia, about 2 l. of the fermentation liquor is passed through a column packed with 50 ml. of $Na^+$ form of Dowex 50 W × 4 (a strongly acidic cation exchange resin available from the Dow Chemical Co., U.S.A.) bufferized with 0.2 M-pH 2.0-citrate buffer prior to use. The product adsorbed on the resin is then eluted with 0.2 M-pH 4.0- citrate buffer and then with 0.2 M-pH 7.0-citrate buffer. Pooled fractions containing the penicillin are adsorbed on active carbon (1.5 l.) and then eluted with 70 percent methanol. The eluate is concentrated in vacuo at 40° C. Adding aceton slowly to the concentrate, crude crystals of the aimed product are obtained. The yield is 2.3 g.

We claim:

1. A method for preparing aminocyclohexylpenicillin, which comprises reacting a penicillin with a compound selected from the group consisting of aminocyclohexylcarboxylic acid, and functionally equivalent derivatives thereof in the presence of an aminocyclohexyl-penicillin producing enzyme derived from the culturing of a microorganism belonging to the genera Pseudomonas, Kluyvera, Escherichia, Aerobacter, Micrococcus, Streptomyces, Nocardia, Aspergillus or Penicillium.

2. The method according to claim 1 wherein the penicillin is 6-aminopenicillanic acid, its alkylesters, alkali metal, alkaline earth metal salts or acid addition salts thereof.

3. The method according to claim 1 wherein the penicillin is Penicillin G.

4. The method according to claim 1 wherein the penicillin is Penicillin V.

5. The method according to claim 1 wherein the reaction is carried out at a pH of from 3 to 8 and at a temperature of from 25° to 50° C.

6. The method according to claim 5 wherein the pH is from 4.5 to 7.5 and the temperature is from 30° to 38° C.

7. The method according to claim 5 wherein the reaction is carried out for from 1 to 24 hours.

8. The method according to claim 1 wherein the enzyme is produced by aerobically culturing the microorganism in a nutrient medium at a temperature of from 20° to 50° C. and a pH of from 5 to 9.

9. The method according to claim 1 wherein the enzyme is contained in the cell bodies of said microorganisms and the reaction is carried out in the presence of said cell bodies.

10. The method according to claim 1 wherein the enzyme is present in a culture liquor obtained from said microorganisms and the reaction is carried out in the presence of said culture liquor.

* * * * *